UNITED STATES PATENT OFFICE.

MYRTIL KAHN, OF ELBERFELD, AND RICHARD KOTHE, OF VOHWINKEL, GERMANY, ASSIGNORS TO FARBENFABRIKEN VORM. FRIEDR. BAYER & CO., OF ELBERFELD, GERMANY, A CORPORATION OF GERMANY.

AZO COLORING-MATTER.

No. 843,149.

Specification of Letters Patent.

Patented Feb. 5, 1907.

Application filed November 6, 1906. Serial No. 342,285.

*To all whom it may concern:*

Be it known that we, MYRTIL KAHN and RICHARD KOTHE, citizens of the German Empire, residing at respectively, Elberfeld and Vohwinkel, near Elberfeld, in the Kingdom of Prussia, Germany, have invented new and useful Improvements in Azo Coloring-Matters, of which the following is a specification.

We have found that new and valuable azo dyestuffs are obtained by combining the diazo compound of 6-nitro-4-chloro-2-amidophenol with 2-arylamino-5-naphthol-7-sulfonic acids.

The new dyestuffs are in the shape of their alkaline salts dark powders soluble in water with a violet color, and dyeing wool from acid baths, generally from red to violet shades, which, on chroming, change to from blue to black fast shades. By reduction of the new dyestuffs with stannous chlorid and hydrochloric acid 2-6-diamino-4-chlorophenol and 2-arylamino-5-naphthol-6-amino-7-sulfonic acids are obtained.

In carrying out the new process practically we can proceed as follows, the parts being by weight: 18.9 parts of 6-nitro-4-chloro-2-aminophenol are diazotized in the usual way and then combined with thirty-two parts of 2-phenylamino-5-naphthol-7-sulfonic acid dissolved in an excess of a sodium carbonate solution. The dyestuff separates completely after a short time. It is filtered off and dried. It is, after being dried and pulverized, in the shape of its sodium salt a dark powder soluble in water with a violet color and in concentrated sulfuric acid with a bluish-red color. By reduction with stannous chlorid and hydrochloric acid 2-6-diamino-4-chlorophenol and 2-phenylamino-5-naphthol-6-amino-7-sulfonic acid is obtained. The new dyestuff dyes wool from acid baths violet shades, which are changed to blue when chromed after dyeing.

The process is carried out in an analogous manner on using other 2-arylamino-5-naphthol-7-sulfonic acids, such as 2-paratolylamino-5-naphthol-7-sulfonic acid, 2-orthoanisylamino-5-naphthol-7-sulfonic acid, or the like.

The dyestuff obtained—*e. g.*, from the diazo compound of 6-nitro-4-chloro-2-aminophenol and 2-paratolylamino-5-naphthol-7-sulfonic acid—dyes wool violet, turning to blue by treatment with chromium compounds.

Having now described our invention and in what manner the same is to be performed, what we claim as new, and desire to secure by Letters Patent, is—

1. The herein-described new azo dyestuffs obtainable by combining the diazo compound of 6-nitro-4-chloro-2-aminophenol with 2-arylamino-5-naphthol-7-sulfonic acids, which dyestuffs are, after being dried and pulverized, in the shape of their alkaline salts dark powders soluble in water; yielding upon reduction with stannous chlorid and hydrochloric acid, 2-6-diamino-4-chlorophenol and 2-arylamino-5-naphthol-6-amino-7-sulfonic acid and dyeing wool from acid baths generally from red to violet shades, which on chroming change to from blue to black shades, substantially as hereinbefore described.

2. The herein-described new azo dyestuff, which can be obtained by combining diazotized 6-nitro-4-chloro-2-aminophenol with 2-phenylamino-5-naphthol-7-sulfonic acid, which dyestuff is, after being dried and pulverized, in the shape of its sodium salt a dark powder soluble in water with a violet color and in concentrated sulfuric acid with a bluish-red color; yielding upon reduction with stannous chlorid and hydrochloric acid 2-6-diamino-4-chlorophenol and 2-phenyl amino-5-naphthol-6-amino-7-sulfonic acid; and dyeing wool from acid baths violet shades, which are changed to blue when chromed after dyeing, substantially as hereinbefore described.

In testimony whereof we have hereunto set our hands in the presence of two subscribing witnesses.

MYRTIL KAHN.
RICHARD KOTHE.

Witnesses:
OTTO KÖNIG,
J. A. RITTERSHAUS.